United States Patent [19]

Robertson et al.

[11] Patent Number: 5,246,896
[45] Date of Patent: Sep. 21, 1993

[54] CERAMIC COMPOSITION

[75] Inventors: John Robertson; Kassim Juma, both of Stafford, England

[73] Assignee: Foesco International Limited, Birmingham, England

[21] Appl. No.: 979,475

[22] Filed: Nov. 20, 1992

Related U.S. Application Data

[63] Continuation of Ser. No. 772,860, Oct. 8, 1991, abandoned.

[30] Foreign Application Priority Data

Oct. 18, 1990 [GB] United Kingdom ................ 9022638

[51] Int. Cl.$^5$ .............................. C04B 35/58
[52] U.S. Cl. ......................... 501/95; 501/97
[58] Field of Search ...................... 501/95, 97; 264/65, 264/63

[56] References Cited

U.S. PATENT DOCUMENTS 4,540,674 9/1985 Watanabe et al. ................ 501/97
4,904,626 2/1990 Shaffer ............................... 501/98

FOREIGN PATENT DOCUMENTS

| | | |
|---|---|---|
| 1240711 | 8/1988 | Canada . |
| 107349 | 5/1984 | European Pat. Off. . |
| 423793A2 | 4/1991 | European Pat. Off. . |
| 56-139260 | 3/1980 | Japan . |
| 57129873 | 1/1981 | Japan . |
| 5806675 | 9/1981 | Japan . |
| 59021575 | 7/1982 | Japan . |
| 61-021976 | 1/1986 | Japan . |
| 63-210064 | 2/1987 | Japan . |
| 288631 | 6/1969 | U.S.S.R. . |

Primary Examiner—Karl Group
Assistant Examiner—Deborah Jones
Attorney, Agent, or Firm—Nixon & Vanderhye

[57] ABSTRACT

An improved ceramic composite material is provided based on zirconia and boron nitride that can be satisfactorily bonded without sintering.

The material comprises a particulate mixture of boron nitride, stabilized zirconia and silicon nitride bonded together by whiskers of silicon nitride. The silicon nitride whiskers may conveniently be formed in-situ by heating the mixture of particulate boron nitride, stabilized zirconia and silicon nitride together with powdered metallic silicon in an atmosphere of nitrogen.

10 Claims, No Drawings

CERAMIC COMPOSITION

This is a continuation of application Ser. No. 07/772,860, filed Oct. 8, 1991, now abandoned.

This invention relates to a novel ceramic composition and to a method of making it.

It is known to use various compositions based on zirconia and boron nitride as formed shapes for various purposes to utilize the ceramic, heat-resistant properties of these materials. However, such compositions normally require a powdered mixture of the ingredients to be sintered after shaping to the desired form in order to achieve the necessary binding together of the individual particles of the mixture that is required if they are to be considered for end uses such as liners for furnace tap holes and breaker rings in horizontal casting units.

U.S. Pat. No. 4,540,674 discloses a silicon nitride composite refractory material having improved thermal shock characteristics and molten steel resistance which consists of silicon nitride at 20 to 60% by weight, refractory material at 10 to 50% by weight and boron nitride at 1 to 20% by weight. The composite has silicon nitride bonds as bonding structures, probably whiskers of silicon nitride. This can be achieved by blending and molding a mixture of silicon, refractory materials, boron nitride and a binder and then heating the molded product at 1200° C. to 1500° C. in an atmosphere of nitrogen or ammonia.

The present invention aims to provide a further improved composite refractory of this type.

Accordingly, in a first aspect, the invention provides a composite ceramic refractory material comprising a particulate mixture of boron nitride, stabilized zirconia and silicon nitride bonded together by whiskers of silicon nitride.

The whiskers of silicon nitride are conveniently formed in-situ by heating the mixture of particulate boron nitride and stabilized zirconia, which additionally contains powdered metallic silicon, in an atmosphere of nitrogen.

Accordingly, in a second aspect the invention provides a method of making a bonded ceramic composite in which a particulate mixture is formed of boron nitride, stabilized zirconia, silicon nitride and silicon, the mixture is formed to the desired shape and is then heated in an atmosphere of nitrogen.

The heating is preferably carried out at between 1000° and 1500° C. especially 1200° to 1400° C., which is substantially lower than the temperatures that would be required to effect adequate sintering of the constituents of the mixture.

The mixture of particulates will normally require to be held together by temporary organic binders, e.g. dextrin or an acrylic binder, during the shaping stage. Such binders, which are well known in the art, are driven off during the firing stage and their role is taken over in the present invention by the reaction of the metallic silicon with the nitrogen which form fibers or whiskers of silicon nitride which bond the particulates of the mixture together.

The incorporation of stabilized zirconia and, particularly, silicon nitride in particulate form, i.e. in addition to the in-situ formed bonding form of silicon nitride, has been found to be particularly advantageous. Although not wishing to be limited by any particular theory, it is believed that the silicon nitride particulate material not only enhances erosion resistance in its own right, but it is preferentially attacked by oxygen and thereby protects the boron nitride from oxygen-degradation. Oxygen reacts with the particulate silicon nitride to form a stable silicon-oxynitride coating, thereby enhancing further the stability and integrity of the product.

In one embodiment of the method of the invention, the particulate materials are mixed with the temporary binder or binders and a slurry of the resulting composition is formed. The slurry is then slip-cast to the desired shape of the final article, the cast shape is dried and then fired under an atmosphere of nitrogen. The firing stage is preferably carried out under moderate pressure, e.g. 2 to 3 p.s.i. (10 to 20 kPa).

In another embodiment of the method, the particulate materials are mixed with the temporary binder or binders and the resulting composition is uniaxially or isostatically pressed, preferably at ambient temperature, to the desired shape. The pressed shape is then fired in an atmosphere of nitrogen as for the above-described slip-cast shape.

The stabilized zirconia may be partially stabilized or fully stabilized. Such zirconias are well known per se in the art and may be stabilized, for example, with yttria or magnesia or other rare earth metallic oxides.

The proportions of the mixture may vary fairly widely but preferably contain from 10 to 30 parts by weight of boron nitride, 20 to 40 parts by weight of stabilized zirconia, 5 to 25 parts by weight of silicon nitride and 15 to 30 parts by weight of silicon metal.

The particulate sizes of the constituents may be, for example:

boron nitride—sub 2 microns
 stabilized zirconia—sub 2 microns
 silicon nitride—sub 53 microns
 silicon—sub53 microns Typically, the finished, fired products may have a porosity from 15 to 40%.

The bonded products of the invention have excellent thermal shock resistance and can, for example, readily accommodate a rapid temperature change of more than 1200° C. They have high thermal conductivity and low thermal expansion and are non-wetting to liquid metals. They exhibit little or no shrinkage on firing unlike conventional ceramic materials which may shrink up to as much as 20%. They are, therefore, eminently suitable for applications such as the above-mentioned liners for furnace tap holes and breaker rings for horizontal casting units and for a variety of other components in continuous casting equipment, crucibles and the like.

The silicon nitride bond that is formed together with the enhancement of properties due to the particulate silicon nitride give the products excellent strength and integrity and the overall properties of the finished material provide excellent erosion resistance to molten metals, e.g. molten steel.

The invention is further illustrated in the following Example.

EXAMPLE

A mixture of the following proportions by weight was made:

| | % by weight | Size |
| --- | --- | --- |
| boron nitride | 22.5 | sub 0.5 micron |
| yttria-stabilised zirconia (11% yttria) | 35.0 | sub 2 micron |
| silicon nitride | 17.5 | sub 53 micron |

-continued

|  | % by weight | Size |
|---|---|---|
| silicon | 25.0 | (300 mesh) sub 53 micron (300 mesh) |

The mixture was then further thoroughly mixed with 1.0% by weight of dextrin binder and was uniaxially pressed into the form of a tap hole liner at a pressure of 750 kgs/cm$^2$ and fired under an atmosphere of nitrogen at a temperature from 1200° C. to 1400° C. for 60 to 100 hours.

The liner so formed was of 130 mm outside diameter, 75 mm inside diameter and had a height of 150 mm.

The liner was set into a small tundish and after preheating a charge of molten steel (300 kgm) with typical BOF composition (0.1% Si; 0.3%, Mn, 0.05%C and traces of S & P) at a measured temperature of 1650° C. was poured through the liner.

The process was repeated continuously—with a 15 minute pause to raise the steel temperature to 1650° C. During the re-heating cycle the temperature of the lining material was allowed to fall to 600° C.-700° C.—before being subjected to an instantaneous temperature step of 1000° C. up to 1650° C. The material was subjected to the thermal shocks of 11 such cycles without exhibiting any physical or mechanical deterioration.

At the completion of the trial the examination of the internal bore of the liner showed no change in dimensions, the non-wetting character of the ceramic having prevented sticking of either the molten steel or slag to the surface.

Subsequent examination of the body of the material via scanning electron microscope showed that contamination of the ceramic bore was limited to a depth of 200 microns.

The example clearly shows the ability of the ceramic material in respect of:
resistance to erosion by hot molten metal,
a high resistance to thermal shock of 1000C°+,
the non-wetting properties of the ceramic to both molten metal and molten slag.

We claim:

1. A composite ceramic refractory material formed from a particulate mixture of boron nitride, stabilized zirconia in the amount of 20–40% by weight and having a particle size of less than two microns, and silicon nitride in the amount of about 5-25% by weight, said particulates being bonded together by whiskers of silicon nitride.

2. A composite ceramic refractory material according to claim 1, in which the mixture contains from 10 to 30% by weight of boron nitride.

3. A composite ceramic refractory material according to claim 1, in which the whiskers of silicon nitride are formed from the incorporation of silicon metal in the mixture.

4. A composite ceramic refractory material according to claim 3, in which the mixture contains 15 to 30% by weight of silicon metal.

5. A composite ceramic refractory material according to claim 1, in which the boron nitride particles in the mixture are less than 2 microns size.

6. A composite ceramic refractory material according to claim 1, in which the silicon nitride particles in the mixture are less than 53 microns size.

7. A composite ceramic refractory material according to claim 3, wherein the silicon has a particle size which is less than 53 microns.

8. A composite as recited in claim 4 in which the mixture contains from 10-30% by weight of boron nitride.

9. A composite ceramic refractory material comprising;
a particulate mixture of boron nitride, stabilized zirconia in the amount of 20–40% by weight and having a particle size of less than two microns, silicon nitride in the amount of about 5-25% by weight and silicon; and
wherein said particulate mixture having zirconia particles of a size of less than two microns has an improved dispersion of zirconia throughout the composite ceramic so as to provide a product having enhanced erosion and oxidation properties compared to refractories having larger particle size.

10. A composite as recited in claim 9 in which the mixture contains from 10-30% by weight of boron nitride.

* * * * *